United States Patent [19]
Fox

[11] Patent Number: 4,658,608
[45] Date of Patent: Apr. 21, 1987

[54] SECURITY VALVE MECHANISM FOR A HYDRAULIC SYSTEM

[76] Inventor: Douglas M. Fox, 7311 Bellenive, Ste. 324, Houston, Tex. 77036

[21] Appl. No.: 670,283

[22] Filed: Nov. 9, 1984

Related U.S. Application Data

[60] Division of Ser. No. 538,058, Sep. 30, 1983, Pat. No. 4,623,630, which is a continuation-in-part of Ser. No. 405,055, Aug. 4, 1982, Pat. No. 4,427,068, which is a continuation-in-part of Ser. No. 347,210, Feb 9, 1982, abandoned.

[51] Int. Cl.$^4$ ............................................. F16K 35/00
[52] U.S. Cl. .................................... 70/179; 137/384.6
[58] Field of Search ............... 70/174, 175, 176, 177, 70/178, 179, 180; 137/383, 384.2, 384.6, 384.8

[56] References Cited

U.S. PATENT DOCUMENTS

| 1,545,712 | 7/1925 | Toy | 70/179 |
| 3,116,752 | 1/1964 | Duncan | 137/384.8 |
| 3,557,584 | 1/1971 | Triglia | 70/179 |
| 4,402,339 | 9/1983 | Owens | 137/384 C |

FOREIGN PATENT DOCUMENTS 994268  8/1951  France ................................. 70/179

Primary Examiner—Robert L. Wolfe
Attorney, Agent, or Firm—David M. Ostfeld

[57] ABSTRACT

A lock mechanism for vehicles, such as cars, forklifts and earth moving equipment, having hydraulic systems for brakes, transmissions or clutches is disclosed. The mechanism includes a double non-return cam and hydraulic actuated valves which when closed retain fluid under pressure in the brake, transmission or clutch system, to prevent movement of the vehicle, such as by holding brakes on or clutches in the disengaged position.

12 Claims, 7 Drawing Figures

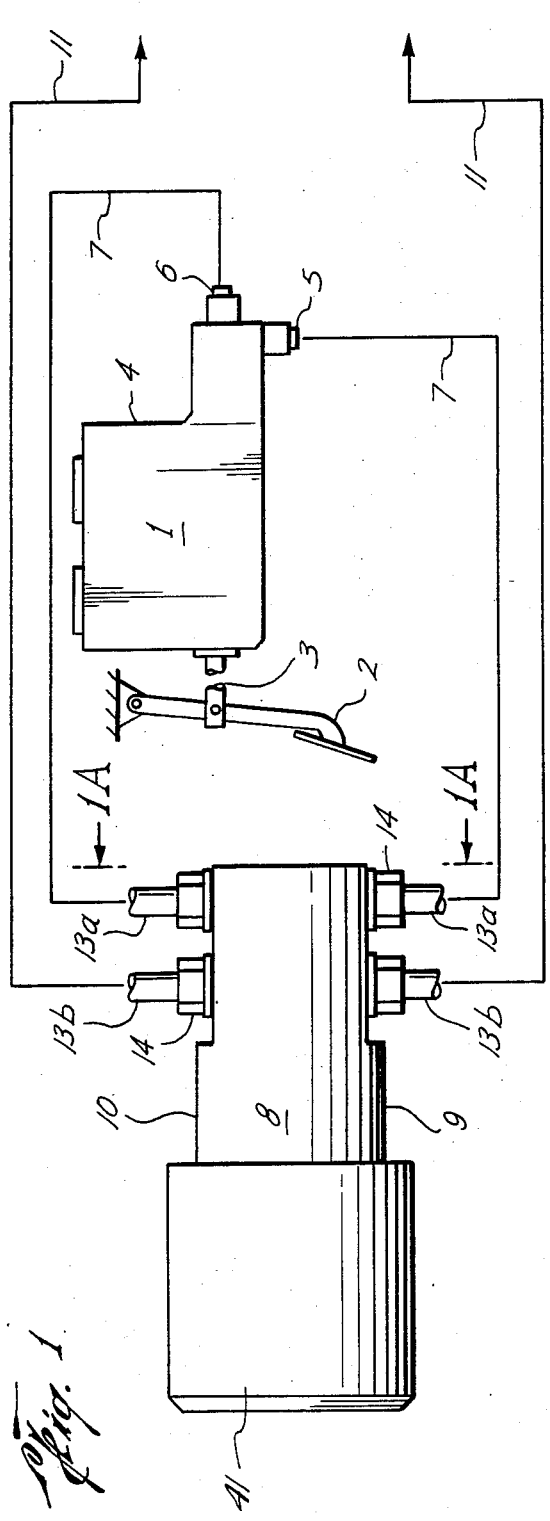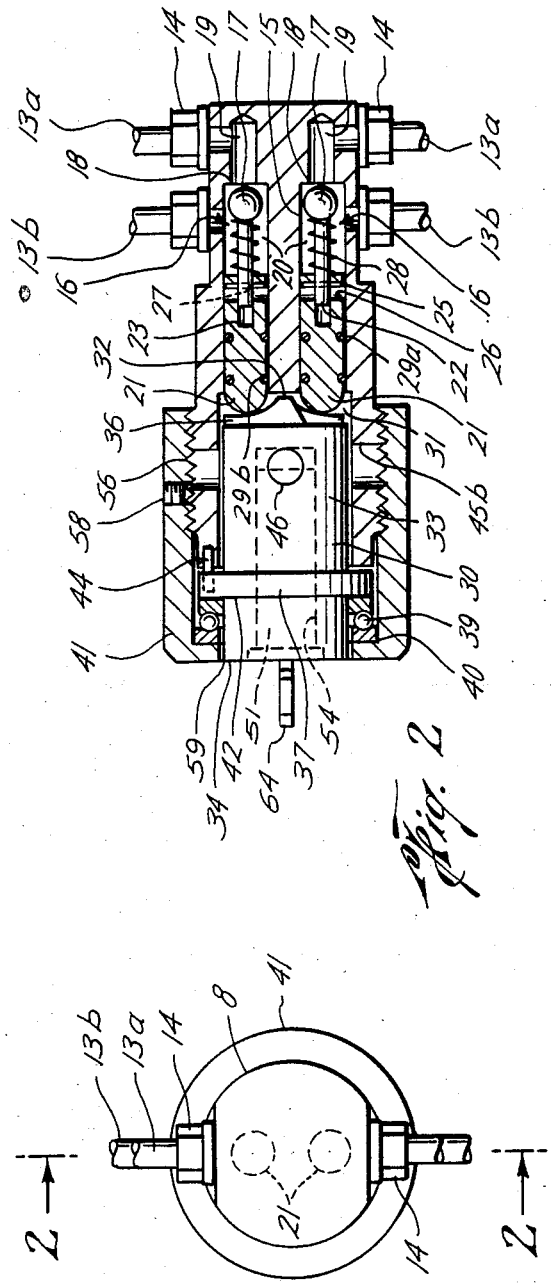

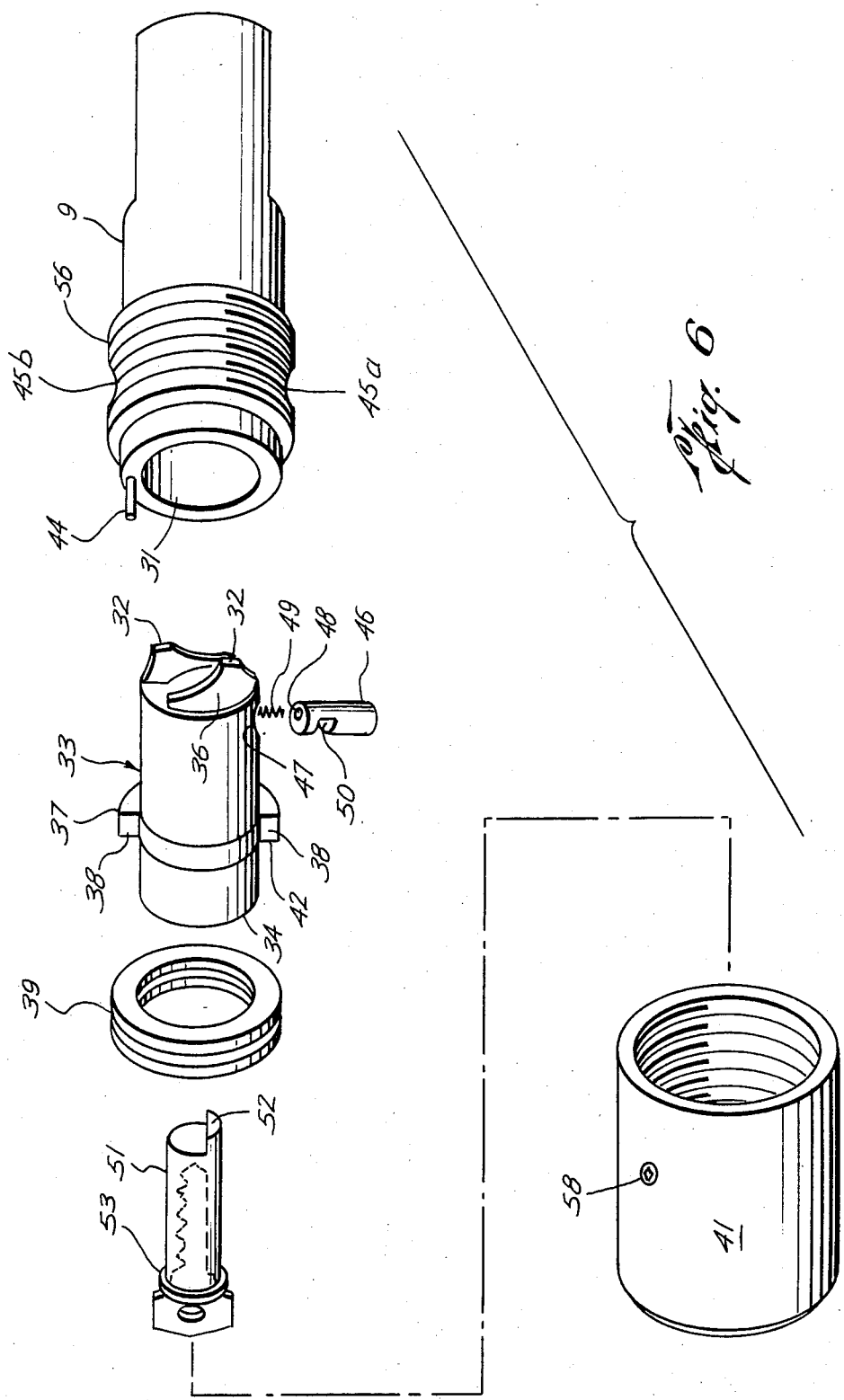

SECURITY VALVE MECHANISM FOR A HYDRAULIC SYSTEM

TECHNICAL FIELD OF THE INVENTION

The invention relates generally to locks and lock mechanisms. More specifically it relates to lock mechanisms for brake and other hydraulic systems for vehicles.

BACKGROUND OF THE INVENTION

A major concern of vehicle owners is the theft of the vehicle. Removing the keys from the ignition and otherwise locking the car has proved to be insufficient to prevent or deter these thefts. The present invention is directed to this problem.

In addition, fleet owners and short stop delivery service companies have concern for theft liability risk factors when the economics concerning the vehicle dictates the leaving for short periods of a delivery vehicle with the motor running. No effective means of security or safety currently exists for a vehicle left in this manner, and a great amount of time and efficiency is lost by completely stopping and locking this type of business vehicle.

In addition, owners of vehicles who carry children have the concern for danger and risk of leaving the children unattended in a vehicle even for a short period of time. This is especially true if the engine is left running for heating or air conditioning. In such situations, playing children or even a pet may inadvertently knock the transmission into an engaged position allowing the vehicle to move and creating the possibility of an accident.

Various anti-theft devices involving a vehicle lock are known in the art. See, for example, U.S. Pat. No. 3,771,547, issued Nov. 13, 1973, to J. Coleman, entitled "Vehicle Lock" and U.S. Pat. No. 3,885,586, issued May 27, 1975 to R. Tibbetts, entitled "Key Actuated Locking Valve". In addition, devices for holding brake hydraulic fluid pressure are also known in the art. See, for example, U.S. Pat. No. 3,468,586, issued Sept. 23, 1969, to C. E. Balkus, entitled "Brake Holding Device". Locking mechanisms for hydraulic braking systems of vehicle are also known in the art. See, for example, U.S. Pat. No. 3,515,442, issued June 2, 1970, to L. C. Whittemore, entitled "Lock for Hydraulic Brakes of Vehicles". In the Whittemore device, a mechanism which must be locked out is utilized to prevent the releasing of pressure from the brake system.

The present invention is directed to the above problems and has as its primary object to provide a simple, safe, effective and economical form of vehicle/equipment security device which operates independently from the ignition, electrical, transmission or engine systems and which can be locked or unlocked only by the use of a proper key. In accordance with this object, the device is capable of being connected into a standard hydraulic brake or clutch hydraulic or other hydraulic system.

A further object of the present invention is that the device be operable without use of electrical circuits and be inaccessible, operated only be means of a particular key. The design of the key so that the system may not be easily disengaged is a portion of the object.

It is a further object of the present invention that the unactivated device have no function and its presence create no possibility of altering the normal performance of the hydraulic circuit in which it has been installed.

DISCLOSURE OF THE INVENTION

A security valve or lock mechanism for locking fluid in or out of a hydraulic system under pressure, especially for systems including brakes or clutches in a vehicle having a fluid operated brake or clutch system, is disclosed. The locking device includes a rotating lock barrel with a lock mechanism that activates a valve to force it into a closed, check valve relationship with the inlet and outlet of a brake system, such that reverse flow of the outlet is prevented by the valve, while further pressurization from the inlet is permitted.

The invention includes a relatively small and compact housing being connected into the hydraulic system, whereby all fluid passing between the master cylinder and the clutch, for example, must pass through the housing. Within the housing are valves adapted to prevent fluid from returning to the master cylinder from the brakes or clutch, as the case may be, and to maintain that fluid under pressure and to permit the repressurization of the fluid. Also included in the housing is a double, non-return cam lock mechanism which activates the valves and in turn is activated by a releasable key.

BRIEF DESCRIPTION OF THE DRAWINGS

For a further understanding of the nature and objects of the present invention, reference is made to the following drawings in which like parts are given like reference numerals, and wherein:

FIG. 1 is a schematic view of the apparatus of the preferred embodiment of the present invention shown in connection with the master cylinder of a hydraulic brake system;

FIG. 1A is an end view of the apparatus of the preferred embodiment of the present invention taken along lines 1A—1A of FIG. 1;

FIG. 2 is a cross-sectional view of the apparatus of the preferred embodiment of the present invention and shows the preferred embodiment of the present invention in an open or "on" or unactivated position;

FIG. 6 is an exploded view of the cam component mechanism of the lock portion of the device of the preferred embodiment of the present invention.

PREFERRED MODE FOR CARRYING OUT THE INVENTION

Figure 3:
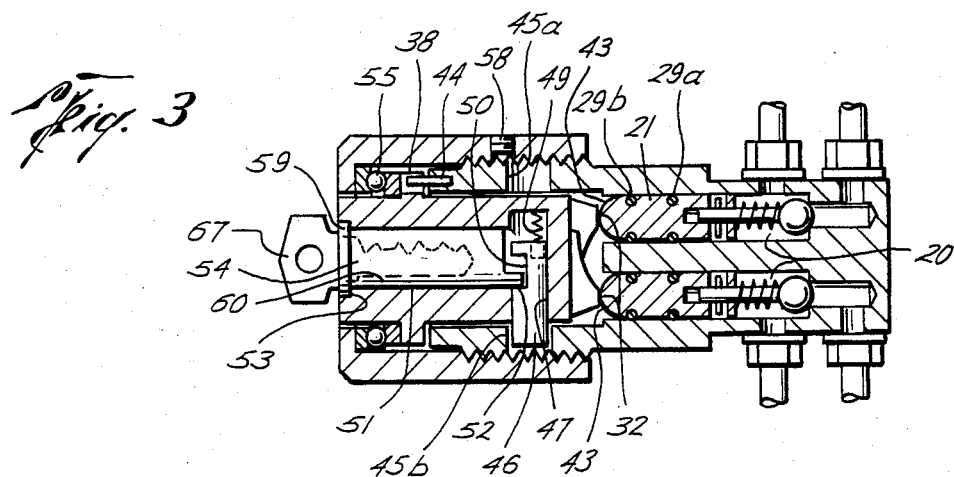
FIG. 3 is a cross-sectional view of the apparatus of the preferred embodiment of FIG. 1 and shows the preferred embodiment of the present invention in a closed or "off" or activated position.

Referring to FIG. 1, the hydraulic lock mechanism of the present invention is generally designated 8 and is adapted to be connected into an hydraulic system (not shown) which communicates fluid between a master cylinder or any other source of fluid under pressure to elements using the fluid, such as the hydraulic circuit shown in FIG. 1.

As shown in FIG. 1, the device 8 may be connected to braking system 1. Braking system 1 includes a brake peddle 2 connected by mechanical coupling 3 to a master cylinder contained in covering 4. As in FIG. 1, the outlet from the master cylinder in covering 4 may have one or more ports. As shown in FIG. 1, two ports 5, 6 are illustrated showing two separate braking systems for the front and rear brakes. Ports 5, 6 are connected by hydraulic lines 7 to device 8.

Device 8 incudes solid housing 9 of body member 10. As shown in FIGS. 1 and 1A, fluid from the master cylinder 4 enters the housing 9 from the lines 7 through ports 13a provided in housing 9. The fluid passes from the housing 9 to the lines 11 and from there to the brakes or clutch (not shown) or similarly activated device through ports 13b. Threaded connectors 14 connect the lines on conduits 7, 11 to the ports 13a, 13b, respectively. Passages 15 (FIG. 2) within the housing 9 provide for communication of the fluid between the ports 13a, 13b through the housing 9 when device 8 is not actuated. Each of passages 15 include a first, large diameter bore 20 coaxial with a small diameter bore 19 having a shoulder in between in which a seat 18 is located. Further, generally contained within the bore 20 and capable of moving between the ports 13a, 13b are valve mechanisms 16.

The valve mechanism 16 include plugs 17, preferably each in the form of a ball. The ball plugs 17 are formed to seat on the annular seats 18 formed or inserted at the transition in the passages 15 between the small diameter bore 19 and the large diameter bore 20 in axial alignment therewith. Preferably, the annular seats 18 for the ball plugs 17 are formed by a coining operation or by the insertion of seats 18 of another material, generally to be teflon (not shown), but dependant on the material of the ball plugs 17.

Figure 4:
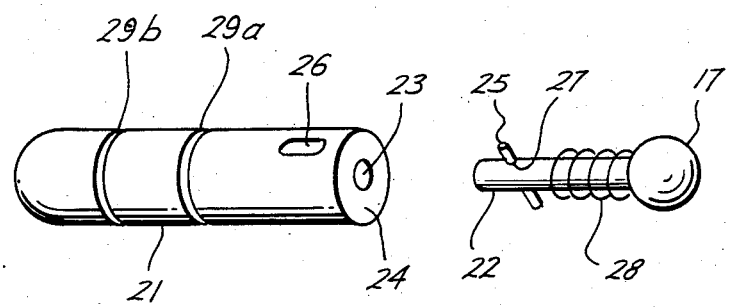
FIG. 4 is an exploded view showing the valve mechanism assembly details of the valve portion of the preferred embodiment of the present invention.

The large diameter bores 20 of the passages 15 contain cam following pistons 21 axially aligned and slidably mounted therein. Pistons 21 are connected to the ball plugs 17 by mechanical means. As shown in FIGS. 2-4, the mechanical means include a shaft 22 fixed at one end of the ball plugs 17 and having its opposing end inserted into bores 23 axially aligned with and formed in one end 24 of the cam following pistons 21. Bores 23 are bored into the piston end surface 24 (FIG. 4) of the cam following piston 21, the piston end 24 being defined as the end of the cam following piston 21 which in normal function is in contact with the hydraulic fluid and as being the end closest to the fluid inlet ports 13a. The shafts 22 are slidably mounted into the piston bores 23 and contained with pins 25. Pins 25 provide means of mechanical control and also allows resilient movement of the ball plugs 17 within the diameter limits of bores 26. Bores 26 are of smaller diameter than bores 23 in the cam following pistons 21 and intersect the piston bores 23 at right angles to and passing completely through the cam following piston 21. The shafts 22 are connected to the ball plugs 17 and have a bore 27 (FIG. 4) passing through them at right angles to the axial alignment of the shafts 22 and at a position so as to be located at the axially aligned center of the piston bores 26 when the shaft 22 of ball plugs 17 are entered into piston bores 23. The pins 25 are inserted through the piston bores 26 passing through the bores 27 of shafts 22. The pins 25 are generally one fifth or less of the diameters of the piston bores 26. The internal diameters of bores 26 provide the extremities of resilient movement of ball plugs 17 and beyond these limits provide the mechanical control over the ball plug 17 of valve mechanism 16 when the cam following pistons 21 are moved either by cam surface 32 or by hydraulic means. The resilient means and resiliency of the ball plug 17 of valve mechanism 16 within bore 26 are provided by a biasing spring 28 through which the shaft 22 of ball plug 17 passes and on which shaft 22, each spring 28 is slidably mounted before insertion into the bores 23 of cam following piston 21. The end surfaces 24 of cam following pistons 21 and the ball plugs 17 are retainers for the biasing spring 28. When the device 8 is in the "lock on" mode (see FIG. 3), the cam following pistons 21 with ball plug 17 of valve mechanisms 16 attached thereto are moved forward by the cam surface 32 in the bore 19 until the ball plugs 17 make contact with and are seated on the valve seats 18 at the intersections of bores 19, 20 within the housing 9. Plugs 17 are held in this position, where the pins 25 passing through cam following pistons 21, bore 26 and ball plug shafts 22 will be located at the axially aligned centers of the bores 26 in the cam following pistons 21 and allow the ball plugs 17 of valve mechanism 16 to rest against seats 18. Resilient movement away from seats 18 occurs when sufficient pressure is applied from the bore 19 acting on the surface of ball 17 abutting seat 18 (such as from the application of the brakes). A pair of O-rings 29a, 29b are mounted concentrically in grooves of the cam following pistons 21 and prevent leakage of fluid out of the hydraulic fluid passages 15.

A cam component 30 is rotatably mounted within a bore 31 in the valve body 10. Bore 31 is directionally aligned with bores 20 and with its axis axially aligned with the axis formed by the locus of points midway between the center axes of the two bores 20 at the minimum distance between such axes and of a diameter that exceeds the diametric extremities of the bores 20. The cam surface 32 is an integral part of the cam component 30. Component 30 has several surfaces and components. It includes cam surface 32, mounted on cam 36 at the end of a rotating lock barrel 33, such end forcing pistons 21. A locking bolt 46 is slidably mounted in a partial bore 47 in barrel 33. Component 30 further includes a lock tumbler 51 (FIG. 3) and tumbler bore 54 at its outer facing end surface 34. Bore 54 is bored off center on surface 34. Component 30 additionally includes a cam thrust ring 37, and rotation limit stop surfaces 38 located on the thrust ring 37 (FIGS. 3 and 6). The cam component 30 is mounted in bore 31 and rotates on a bearing 39 which is mounted in the thrust bearing housing 40 of the component 30 retaining cap 41. The cam retaiing cap 41 of componetn 30 is provided at the surface 34 end of barrel 33 to retain bearing housing 40 and cam component 30 and mechanism 60. The bearing 39 makes contact between the retaining cap 41 and bearing housing 40 and the thrust ring 37 surface 42 of the cam component 30. The cam following pistons 21 (FIG. 3) having one end surface 43 slidably contacting the cam surface 32 of cam 36 are slidably movable within the bores 20 of the passages 15 which extend to the valve seats 18. The cam component 30 limit of rotation stop surfaces 38, on rotation of cam component 30 to the "on" or "off" positions of device 8 make contact with a limit of rotation travel pin 44 (FIGS. 3 and 6) which is fixed onto and protrudes from the housing 9 at a location which permits the positioning by cam 36 of pistons 21 to permit the device 8 to operate and seat ball 17 against seat 18. Two further bores 45a, 45b (FIG. 6) are axially at right angles to the portion of bore 31 housing the cam component 30 and radially situated in housing 9 to receive locking bolt 46 to hold device 8 in lock on or off mode as desired. Bolt 46 maintains the device 8 in the desired mode giving the device 8 positive on of off function mode.

The locking bolt 46 includes a cylindrical shaft slidably mounted in a bore 47 in the barrel 33, bore 47 being axially aligned at right angles to the axial alignment of cam component 30 when slidably mounted in bore 31. The locking bolt 46 is also provided with resilient means such as a spring 49 mounted in a bore 48 formed off center in the locking bolt 46. The bore 48 is aligned with the length of the cylinder of locking bolt 46 but bores on a center parallel to the axial center line of the cylinder of locking bolt 46. This bore 48 forms a retainer for the resilient means biasing spring 49 mounted in the bore 48 of the cylinder of bolt 46. A slot is formed in the cylinder of locking bolt 46 and at right angles to the axial alignment of the lock bolt cylinder 46. Slot 50 is formed extending inwardly to the axial center line of the cylinder body of lock bolt 46. It is formed by removing a portion of the cylinder body of lock bolt 46 and is equal to fifty percent of the modular cross section of bolt cylinder 46.

The lock mechanism also includes a tumbler 51 (FIG. 6) from which extends a protruding surface 52. Surface 52 is received in slot 50 of bolt cylinder 46. Surface 52 is a cantalevered protrusion off center of the lock tumbler 51 and is part of tumbler 51. Surface 52 is on the opposite face of tumbler 52 from the slot 53 of tumbler 51.

The cam component 30 has a further bore 54 running parallel with the axial aligned center line of the cam component 30. Bore 54 is formed in barrel 33 and extends from surface 34 to a depth which intersects with the axial center line of bore 47 in cam component 30 and forms a housing 3 for the tumbler 51. The lock bolt cylinder 46 is slidably mounted and fits in bore 47. The slot 50 end of lock bolt cylinder 46, being the end of the lock bolt cylinder 46 which first enters the bore 47, in assembly is located at the intersection of cam component bores 47, 54. The bore 54 of cam component 30 accommodates the lock tumbler 51 of which the cantalevered surface 52 of the tumbler 51 is the end of the lock tumbler that first enters into bore 54 and locates at the intersection of bores 47, 54 with the cantalevered surface 52 to be located at a point within the slot 50 of lock bolt 46.

Retaining cap 41 which is threadable connected by threads 56 to the valve body 10 completes the assembly. Removal of the retaining cap 41 and thrust bearing housing 40 is prevented by a lock screw 58 embedded in the thread 56 of the retaining cap 41 and body 10. The thrust bearing housing 40 and retaining cap 41 have an opening 59 provided for insertion of the operation key 64 (FIG. 5) into mechanism 60 of hydrualic device 8.

ASSEMBLY DESCRIPTION

The hydraulic lock security device comprises therefore two basic sections, (1) valves and valve housing and (2) lock and cam, assembled together in the following manner.

Valve and Valve Housing

A body 10 is used for containment of the valves and fluid lines. Body 10 is formed with bores and parts within to allow passage of the fluid within the valve body 10. The valves mechanisms 16 and pistons 21 are then connected (FIG. 4) by shaft 22 being inserted into bore 23 of piston 21 and locating at a point where bore 27 of shaft 22 can receive pin 25 when passed through bore 26 in piston 21. Pistons with valve mechanism 16 attached are then inserted, balls 17 end first into bores 20 of housing 10 and moves up until ball 17 contact seats 18, the pistons 21 already having been fitted with O rings 23 at this point.

Lock and Cam

The cam component 30 includes the lock tumbler 51 and lock bolt 46 housing and assembles to form an integral piece in the following fashion (FIG. 6). Bolt 46 with spring 49 inserted in bore 48 is inserted into bore 47 with the slot 50 facing away from cam 36. Tumbler 51 is then inserted into bore 54 with surface 52 inserted first. Insertion continues until surface 52 extends within bolt slot 50. Cam component 30 is then ready to be mounted into bore 31 of valve body 10. Bolt 46 must be compressed by hand (against bolt biasing spring 49), and this will allow cam component 30 to enter bore 31. The cam 36 end is inserted first. The component 30 is inserted until bolt 46 aligns with bore 45A and the bolt spring 40 forces bolt 46 into bore 45A. (With bolt 46 in bore 45A, the cam 36 is not contacting pistons 21 surfaces.) At this point thrust bearing housing 40 is mounted on cam component 30 and will rest on thrust surface 42 of component 30. Retaining cap 41 is then mounted on component 30 and connected threadably to thread 56 of body 10 and tightened until correct clearance is obtained on the thrust bearing 39 to allow smooth operation and rotation of cam component 30. The thread 56 connection is then fixed at the correct clearance by screw 58 between cap 41 and thread 56 of housing 10. A key 64 is then entered into slot 53 of tumbler 51 for operation of lock.

OPERATION

In operation, key 64 is entered into key slot 53 of device 8 (presuming original position is in the "off" mode) and turned in a clockwise direction. On a 90° turn of the key, the bolt 46 withdraws from bore 45A in body 10 by action of protrusion 52. Further, clockwise motion of key 64 then rotates the complete cam component 30 in a clockwise direction until thrust ring 37 travel limit stop surface comes into contact with limit of travel pin 44. At this point, on release of key 64, bolt 46 will enter bore 45B through the action of spring 49. The device 8 is now in the "on" mode. This second part of the rotation of cam component 30 rotates surfaces 32 of cam 36 and make contact with cam following pistons 21. Cam surface 32 forces the pistons 21 to further enter the bores 20 where they are mounted and moves them up until the ball plug 17 attached to the piston is in contact with the valve seats 18 and such contact compresses spring 28 until pin 25 is located at the center of piston bore 26. (At this point, lock device 8 can be considered in the "on" mode.) Fluid on the brakes side of ball plug 17 will now not flow past the ball plug 17. Should there be an increase of pressure from lines 7, such as from depression of pedal 2, this pressure will force ball plug 17 off seat 18 and allow fluid to enter into housing 9 and out of lines 11 allowing the lines 11 of the system in which lock is employed to retain pressure or be repressurized with no release of this pressure possible. Any pressure drop in the line 7 side of the system reseats the ball plug 17 at seal 18. In this way, the fluid becomes locked into the circuit under pressure.

To release the lock fluid system, the key 64 must be rotated in a counter clockwise direction and on a ninety degree rotation protrusion 52 causes to bolt 46 to withdraw from bore 45B and allow cam component 30 to rotate until rotation limit of travel stop surface 38 comes into contact with limit of travel pin 44. At this point release of key 64 will allow bolt 46 to enter bore 45A by action of spring 49 and hold the lock in the "off" mode.

Rotation of cam component 30 in a counter clockwise direction moves the surface 32 of cam 36 away from cam following pistons 21 and the fluid pressure in the system, or any subsequent fluid pressure, then hydraulics the pistons 21 with valve mechanism 16 attached away from seat 18 and propels them into a position within bores 20 where they no longer have any function. This again restores the "off" function mode. A clockwise motion of cam component only can reposition valve mechanism 16 into the "on" function mode.

ALTERNATE EMBODIMENT

Figure 5:
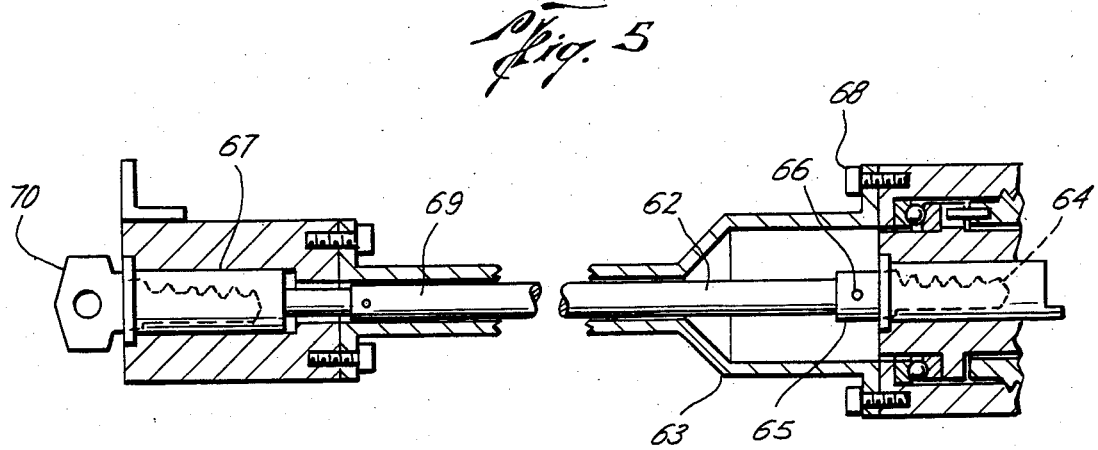
FIG. 5 is a sectional view illustrating an alternate control extension for the key mechanism of the device of the preferred embodiment of the present invention.

The alternate control extension mechanism 61 addition for hydraulic lock device 8 is shown in FIG. 5. Mechanism 61 is an addition to the preferred embodiment of device 8. Control extension mechanism 61 is connected by a flexible shft 62 within an armor sheath 63 between key 64 and conventional lock 67. The armor 63 is of such a diameter as to allow unrestricted rotational and slidable movement of the flexible shaft 62 within the armor 63. The flexible shaft 62 has a key 64 profile formed on the end surface 62 and this key profile surface 64 fits into the key slot 60 of device 8. The key 64 is fixed into key slot 60 by a rivet 66 which passes through an extension of lock tumbler 51 and key profile surface 65 of flexible shaft 62 and holds key profile surface 65 in position with key slot 60. The flexible shaft 62 on the end remote from the device 9 has the additional conventional tumbler lock 67 which can be alternately a combination lock (not shown) or a key 70 operation in a simple conventional lock 67. The end surface 69 of flexible shaft extension 62 is lcoated remotely from device 8 and is connected to the additional conventional lock 67 with a slidable style of coupling (not shown) or joinder that may disengage if the conventional lock 67 is tampered with or pulled. The slidable connection (not shown) is located at a distance within the outer armor sheath 63 so as to make the flexible shaft 62 extension generally difficult to grasp and to turn, and provides a maximum of security. The outer armor sheath 63 is connected to the cap 41 of the device 8 by lock screws 68 or other means and to the conventional lock 67 by lock screws or other means. The armor sheath 63 should be of a diameter such that it will allow unrestricted rotational and slidable movement of the flexible shaft 62 and the slidable connector (not shown) of shaft 62 and conventional lock 67 within. The control extension mechanism 61 can be of a length determined as application and installation necessitates.

Because many varying and different embodiments may be made within the scope of the inventive concept herein taught including equivalent structures or materials hereinafter thought of, and because many modifications may be made in the embodiments herein detailed in accordance with the descriptive requirements of the law, it is to be understood that the details herein are to be interpreted as illustrative and not in a limiting sense.

What is claimed is:

1. A security valve mechanism for use between a source of hydraulic pressure and a pressure actuated mechanism comprising:
   a housing apertures in said housing;
   a duct in said housing in fluid communication with said apertures;
   a movable check valve in said housing;
   transportation means for moving said movable check valve to either of two positions, the first said position being intrusive to said duct, the second said position being one withdrawn from said duct;
   wherein said movable check valve in said first position allows the selective opening or closing of said duct to allow flow of fluid in one direction but in said second position flow of fluid along said duct is permissible in either direction.

2. The mechanism of claim 1, wherein said duct includes a first shoulder between said apertures and a valve seat thereon; said movable check valve includes a valve element adapted to sit against said seat when said movable check valve is in said first position.

3. The mechanism of claim 2, wherein said transportation means includes:
   a passageway intersecting said duct;
   a first piston axially aligned and slideably mounted in said passageway having a first surface facing said first shoulder.

4. A locking device for a vehicle having hydraulic brakes actuated from a master cylinder assembly, comprising in combination:
   a housing having a first passage; a second passage intersecting said first passage; a valve seal at the junction of said passages; a movable valve element within said second passage having a first position at which said element is intrusive to said first passage and engageable with said seat, and a second position at which said element is remote from said first passage and not engageable with said seat; resilient means within said second passage for urging said valve element into contact with said seat when said element occupies said first position; said housing having a third passage coaxial with said second passage and at a location remote from said seat; a key operated rotary cam axially insertable into said third passage; a cam follower slidably mounted in said second passage and operable to move said valve element to said first position upon turning of said cam; said cam follower being axially movable only in said second passage for contact with said rotary cam; means for sealing said cam follower with respect to said second passage; means on said housing for establishing communication between said first passage and the master cylinder assembly, and means of said housing for establishing communication between said first passage and the vehicle brakes.

5. The mechanism of claim 3, wherein said first piston has a cam actuated surface on the other end of said first piston from said first surface.

6. The mechanism of claim 3, wherein said transportation means includes a first bore in said first surface, forming a second shoulder; and a second piston axially aligned and slidably mounted in said first bore, said second piston connected to said valve element; and said second piston includes stop means for limiting the movement of said second piston in said first bore.

7. The mechanism of claim 6, wherein said stop means includes:
   a second bore in the side of said first piston in communication with said first bore;

a pin extending from said second piston into said second bore.

8. The mechanism of claim 5, wherein there is further included:
   a cam surface actuated justaposed to said cam actuated surface;
   a lock;
   a key adapted for insertion in said lock; actuator means responsive to said lock for causing said cam surface actuator to contact and force forward said cam actuated surface.

9. The mechanism of claim 8, wherein said actuator means further includes means responsive to said lock for causing said cam surface actuator to return to its juxtaposed noncontact position with said cam actuated surface.

10. The mechanism of claim 9, wherein there is further includes safety means for holding said cam surface actuator in its position upon removal of said lock.

11. A locking device for a vehicle having hydraulic brakes actuated from a master cylinder assembly, comprising in combination: a housing having a first bore and a second bore of larger size in axial alignment therewith and intersecting said first bore, a valve seat at the junction of said bores, a movable valve element within said second bore engageable with said seat, resilient means within said second bore urging the valve element into contact with said seat, said housing having a third bore coaxial with said second bore and at a location remote from said seat, a key-operated rotary cam axially insertable into said third bore, a cam follower slidably mounted in said second bore and operable to move said valve element onto said seat upon turning of said cam, said cam follower being axially movable only in said second bore for contact with said rotary cam, means sealing said cam follower with respect to said second bore, means on said housing for establishing communication between said first bore and the master cylinder assembly, and means on said housing for establishing communication between said second bore and the vehicle brakes.

12. The device of claim 4, wherein said valve element comprises a ball, and wherein said seat is coined to conform to said ball surface.

* * * * *